(12) United States Patent
Rodrigues

(10) Patent No.: US 9,812,897 B2
(45) Date of Patent: Nov. 7, 2017

(54) APPARATUS, SYSTEM, AND METHOD FOR PROVIDING POWER REDUNDANCY TO A DEVICE DESIGNED TO DRAW POWER FROM A SINGLE EXTERNAL POWER ADAPTER

(71) Applicant: Juniper Networks, Inc., Sunnyvale, CA (US)

(72) Inventor: Paulo Rodrigues, Surrey (GB)

(73) Assignee: Juniper Networks, Inc., Sunnyvale, CA (US)

( * ) Notice: Subject to any disclaimer, the term of this patent is extended or adjusted under 35 U.S.C. 154(b) by 630 days.

(21) Appl. No.: 13/936,056

(22) Filed: Jul. 5, 2013

(65) Prior Publication Data

US 2014/0328094 A1    Nov. 6, 2014

(30) Foreign Application Priority Data

May 5, 2013    (GB) .................... 1308107.0

(51) Int. Cl.
*H02J 9/00* (2006.01)
*H02J 7/00* (2006.01)
*H02J 9/06* (2006.01)
*H02J 3/14* (2006.01)
*H02J 1/10* (2006.01)
*H02J 4/00* (2006.01)
*H02M 1/10* (2006.01)

(52) U.S. Cl.
CPC ........ *H02J 9/06* (2013.01); *H02J 1/10* (2013.01); *H02J 3/14* (2013.01); *H02J 4/00* (2013.01); *H02M 1/10* (2013.01)

(58) Field of Classification Search
CPC ........ H02J 3/14; H02J 4/00; H02J 7/00; H02J 9/061; H02J 9/062; H02J 9/06; H02M 1/10
USPC ..... 307/64, 107, 128, 39, 43, 82; 363/39, 43
See application file for complete search history.

(56) References Cited

U.S. PATENT DOCUMENTS

| 3,808,452 A | 4/1974 | Hutchinson |
| 4,075,502 A | 2/1978 | Walley, Jr. |
| 5,319,536 A | 6/1994 | Malik |

(Continued)

FOREIGN PATENT DOCUMENTS

| EP | 0215348 B1 | 12/1993 |
| EP | 0463261 B1 | 10/1995 |

*Primary Examiner* — Fritz M Fleming
*Assistant Examiner* — Jagdeep Dhillon
(74) *Attorney, Agent, or Firm* — FisherBroyles, LLP

(57) ABSTRACT

An apparatus may include a plurality of power inputs configured to receive direct current from a plurality of external power adapters that convert alternating current to direct current. The plurality of external power adapters may include a primary external power adapter and at least one backup external power adapter. The apparatus may also include a power output configured to provide direct current to a device. In addition, the apparatus may include a switching mechanism that, when the primary external power adapter is operational, supplies direct current from the primary external power adapter to the power output and, when the primary external power adapter fails, supplies direct current from the backup external power adapter to the power output. Various additional apparatuses, systems, and methods are also disclosed.

20 Claims, 6 Drawing Sheets

(56) References Cited

U.S. PATENT DOCUMENTS

| | | | | |
|---|---|---|---|---|
| 5,982,652 | A | * | 11/1999 | Simonelli ............... H02J 9/062 307/26 |
| 7,224,086 | B2 | * | 5/2007 | Germagian ............ A45C 13/02 307/128 |
| 7,877,622 | B2 | | 1/2011 | Gruendler |
| 8,294,298 | B2 | | 10/2012 | Yang |
| 8,310,100 | B2 | | 11/2012 | Humphrey et al. |
| 8,400,795 | B2 | | 3/2013 | Blackwell et al. |
| 2006/0267547 | A1 | * | 11/2006 | Godovich ......... H01M 10/0413 320/107 |
| 2009/0309419 | A1 | * | 12/2009 | Yamasaki ............... G06F 1/263 307/39 |
| 2011/0278921 | A1 | * | 11/2011 | Fretheim .................. H02J 3/38 307/24 |
| 2013/0049474 | A1 | | 2/2013 | Young |
| 2013/0147272 | A1 | * | 6/2013 | Johnson .................... H02J 3/36 307/29 |

\* cited by examiner

APPARATUS, SYSTEM, AND METHOD FOR PROVIDING POWER REDUNDANCY TO A DEVICE DESIGNED TO DRAW POWER FROM A SINGLE EXTERNAL POWER ADAPTER

CROSS REFERENCE TO RELATED APPLICATION

This application claims the benefit of U.K. Application No. GB1308107.0, filed 5 May 2013, the disclosure of which is incorporated, in its entirety, by this reference.

BACKGROUND

Consumer-level electronic devices, such as IP-based telephones, access points, routers, and switches, are often powered by a single external power adapter that converts alternating current into direct current. While the inexpensive nature of these devices may be appealing, businesses and other organizations are often hesitant to use these devices in situations that require continuous operation without interruption since (1) their reliance on a single external power adapter represents a single point of failure and (2) external power adapters typically have a much higher rate of failure than the devices they power due to their exposure to power fluctuations and waste heat.

In some cases, business or other organizations may attempt to address these potential failures by purchasing redundant devices and/or external power adapters as backups and/or by replacing these devices with significantly more expensive systems that include internal redundant power supplies. Unfortunately, these attempts may be unacceptable (in, e.g., situations where even a momentary interruption of service is undesirable) and/or cost-prohibitive.

SUMMARY

As will be described in greater detail below, the instant disclosure describes various apparatuses, systems, and methods for providing power to devices that were originally designed to draw power from a single external power supply. In one example, an apparatus for accomplishing such a task may include a plurality of power inputs configured to receive direct current from a plurality of external power adapters that convert alternating current to direct current. In this example, the plurality of external power adapters may include a primary external power adapter and at least one backup external power adapter. The apparatus may also include a power output configured to provide direct current to a device. In addition, the apparatus may include a switching mechanism that, when the primary external power adapter is operational, supplies direct current from the primary external power adapter to the power output and, when the primary external power adapter fails, supplies direct current from the backup external power adapter to the power output.

Similarly, a system incorporating the above-described apparatus may include a plurality of external power adapters that convert alternating current to direct current. The plurality of external power adapters may include a primary external power adapter and at least one backup external power adapter. The system may also include an apparatus that includes a (1) plurality of power inputs that are electrically coupled to, and draw direct current from, the plurality of external power adapters, (2) a power output, and (3) a switching mechanism that, when the primary external power adapter is operational, supplies direct current from the primary external power adapter to the power output and, when the primary external power adapter fails, supplies direct current from the backup external power adapter to the power output. The system may also include a device that is electrically coupled to, and draws direct current from, the power output of the apparatus.

A corresponding method may include drawing direct current from at least one of a plurality of external power adapters that convert alternating current to direct current, where the plurality of external power adapters include a primary external power adapter and at least one backup external power adapter. When the primary external power adapter is operational, the method may include supplying direct current from the primary external power adapter to a power output. However, when the primary external power adapter fails, the method may include supplying direct current from the backup external power adapter to the power output.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
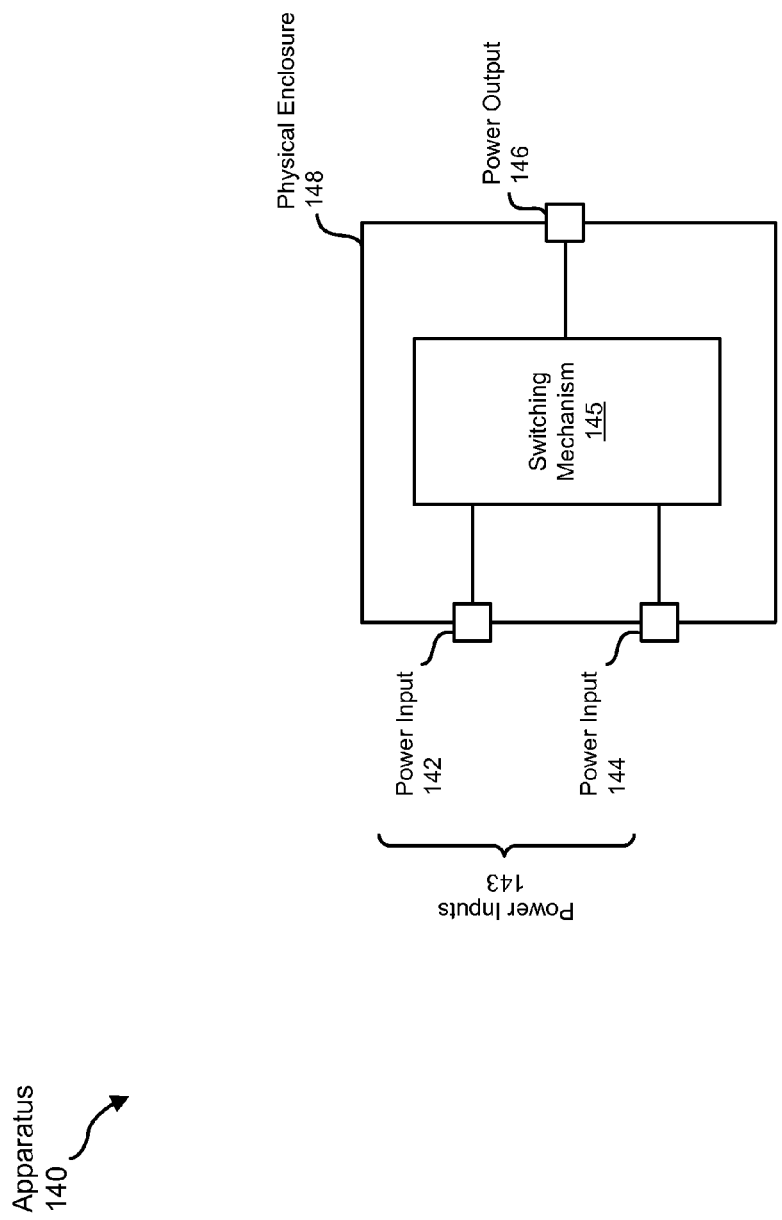
FIG. 1 is a block diagram of an exemplary apparatus for providing power redundancy to a device designed to draw power from a single external power adapter.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for providing power redundancy to a device designed to draw power from a single external power adapter. As will be explained in greater detail below, embodiments of the instant disclosure may enable devices that were originally designed and manufactured to draw direct current from a single external power adapter to experience the benefits of power redundancy.

The following will provide, with reference to FIGS. 1-4, examples of exemplary apparatuses and systems for providing power redundancy to a device designed to draw power from a single external power adapter. A detailed description of an exemplary method for providing power redundancy to a device designed to draw power from a single external power adapter will also be provided in connection with FIG. 5. Finally, the discussion corresponding to FIG. 6 will provide numerous examples of systems that may benefit from and/or include the components and circuits shown in FIGS. 1-4.

FIG. 1 is a block diagram of an exemplary apparatus 140 for providing power redundancy to a device designed to draw power from a single external power adapter. As shown in FIG. 1, apparatus 140 may include a plurality of power inputs 143, including power input 142 and power input 144. The term "power input," as used herein, generally refers to any type or form of terminal or connector capable of conducting electricity. In the example illustrated in FIG. 1, power inputs 143 may be configured to receive or draw direct current from a plurality of external power adapters, such as primary external power adapter 120 and backup external power adapter 130 in FIG. 2, that convert alternating current to direct current.

The term "power adapter," as used herein, generally refers to any type or form of device or component (or group of devices or components, active or passive) capable of converting alternating current to direct current. Similarly, the term "external power adapter," as used herein, generally refers to a power adapter that is housed in a physical enclosure that is external to, and separate from, a physical enclosure that houses a device that the external power adapter powers. In some examples, external power adapters may be used to provide power to devices (such as device 150 in FIG. 2) that require direct current to operate but do not contain the internal components needed to derive direct current from an alternating current power source.

Figure 2:
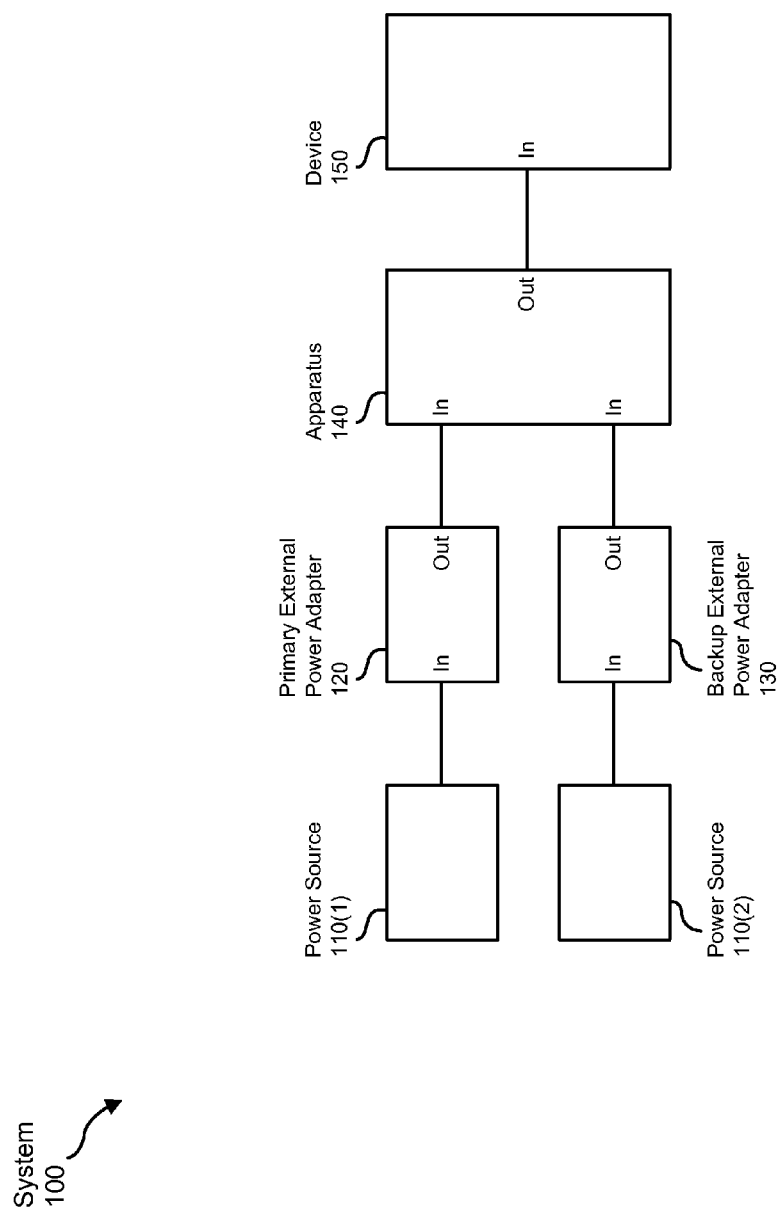
FIG. 2 is a block diagram of an exemplary system for providing power redundancy to a device designed to draw power from a single external power adapter.

As illustrated in FIGS. 1 and 2, in some examples primary external power adapter 120 and backup external power adapter 130 may be housed in physical enclosures that are external to, and separate from, a physical enclosure 148 that houses apparatus 140. In addition, in some examples primary external power adapter 120 may be housed in a physical enclosure that is external to, and separate from, a physical enclosure that houses backup external power adapter 130. In these examples, the power outputs of primary external power adapter 120 and backup external power adapter 130 may be removably and electrically coupled to power inputs 143 of apparatus 140. As will be explained in greater detail below, this removable coupling may enable a user of system 100 in FIG. 2 to quickly and easily replace primary external power adapter 120 and/or backup external power adapter 130 upon failure of the same.

In one embodiment, primary external power adapter 120, external power adapter 130, and apparatus 140 may be manufactured by the same manufacturer. In another embodiment, external power adapter 120, external power adapter 130, and/or apparatus 140 may be manufactured by different manufacturers. In either embodiment, the power outputs of primary external power adapter 120 and backup external power adapter 130 may be electrically coupled to power inputs 143 of apparatus 140 via one or more cables (provided, e.g., by a manufacturer of primary external power adapter 120, backup external power adapter 130, apparatus 140, and/or a device, such as device 150 in FIG. 2, to be powered by system 100).

In one example, power adapter 120 and backup external power adapter 130 may be configured to draw alternating current from independent power sources, each of which may be capable of individually providing power to an electrical load (such as device 150 in FIG. 2). For example, and as illustrated in FIG. 2, primary external power adapter 120 may draw power from a first power source 110(1), while backup external power adapter 130 may draw power from a second (and independent) power source 110(2). In this example, power source 110(1) and power source 110(2) may each be capable of individually powering an electrical device (such as device 150 in FIG. 2), such that the failure of a single power source will not impact operation of the device.

As illustrated in FIG. 1, apparatus 140 may also include a power output 146 configured to provide direct current to a device, such as device 150 in FIG. 2. The term "device," as used herein, generally refers to any type or form of device or component (or group of devices or components, such as, e.g., computing system 600 in FIG. 6, as detailed below) capable of consuming power. In one example, device 150 may require direct current to operate, but may lack the internal components needed to derive direct current from an alternating current power source. In addition, device 150 may only include a single power input. In other words, device 150 may have originally been designed and manufactured to draw direct current from a single external power adapter, thus only necessitating a single power input. Examples of device 150 include, without limitation, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), access points, distributed computing systems, servers, communications appliances (e.g., IP-based telephone systems), and/or any other type or form of computing system or device.

As with power inputs 143, power output 146 of apparatus 140 generally represents any type or form of terminal or connector capable of conducting electricity. In one example, the connecting mechanism of power output 146 may be identical to the connecting mechanisms of the power outputs of primary external power adapter 120 and/or backup external power adapter 130. This may enable power output 146 of apparatus 140 to be removably coupled to the power input of device 150 (which may have been originally designed to be removably coupled to the power outputs of primary external power adapter 120 and/or backup external power adapter 130). In another example, the connecting mechanism of power output 146 of apparatus 140 may differ from the connecting mechanisms of the power outputs of primary external power adapter 120 and/or backup external power adapter 130, such that an adapter or additional connecting mechanism may be required to removably couple power output 146 of apparatus 140 to the power input of device 150.

Similarly, the connecting mechanisms of power inputs 143 of apparatus 140 may be identical to the connecting mechanisms of the power input of device 150. This may enable power inputs 143 of apparatus 140 to be removably coupled to the power outputs of primary external power adapter 120 and/or backup external power adapter 130 (which may have been originally designed to be removably coupled to the power input of device 150). In another example, the connecting mechanisms of power inputs 143 of apparatus 140 may differ from the connecting mechanisms of the power input of device 150, such that an adapter or additional connecting mechanism may be required to removably couple power inputs 143 of apparatus 140 to the power outputs of primary external power adapter 120 and/or backup external power adapter 130.

As illustrated in FIG. 1, apparatus 140 may also include a switching mechanism 145. The term "switching mechanism," as used herein, generally refers to any type or form of mechanical, electrical, or electronic device or component (or group of devices or components, active or passive) capable of interrupting or diverting current in an electrical path.

Switching mechanism 145 may perform a variety of functions. In one example, switching mechanism 145 may intelligently provide power from primary external power adapter 120 and/or backup external power adapter 130 to power output 146 of apparatus 140 (and thus device 150). For example, when primary external power adapter 120 is operational, switching mechanism 145 may supply direct current from primary external power adapter 120 to power output 146 of apparatus 140. However, when primary external power adapter 120 fails, switching mechanism 145 may supply direct current from backup external power adapter 130 to power output 146 of apparatus 140. As will be explained in greater detail below, switching mechanism 145 may thus enable device 150 (which may, as explained above, have originally been designed and manufactured to draw direct current from a single external power adapter) to experience the benefits of power redundancy.

The terms "operational" and "failure" or "fail," as used herein, generally refer to whether an apparatus (such as an external power adapter) is currently providing power to an electrical load. As such, an external power adapter may "fail" due to (1) the malfunction of the external power adapter itself and/or (2) the malfunction of a power supply from which the external power adapter draws alternating current. Similarly, an external power adapter may only be considered "operational" if both the external power adapter and the power source from which the external power adapter draws alternating current are currently supplying power (e.g., alternating current in the case of the power source and direct current in the case of the external power adapter).

Switching mechanism 145 may detect or determine that an external power adapter is operational or has failed in a variety of ways using a variety of components. For example, if switching mechanism 145 detects direct current (using, e.g., a feedback loop or other detection mechanism) at power input 142 of apparatus 140, then switching mechanism 145 may determine that primary external power adapter 120 is operational. In contrast, if switching mechanism 145 does not detect direct current at power input 142, then switching mechanism 145 may determine that primary external power adapter 120 (and/or power source 110(1)) has failed.

In one example, switching mechanism 145 may simultaneously provide direct current from both primary external power adapter 120 and backup external power adapter 130 to power output 146 of apparatus 140. In other examples, however, switching mechanism 145 may only provide direct current to power output 146 of apparatus 140 from a single external power adapter at a time. For example, switching mechanism 145 may prevent or inhibit backup external power adapter 130 from supplying direct current to power output 146 of apparatus 140 when primary external power adapter 120 is operational. By so doing, switching mechanism 145 may both conserve power (since, e.g., only a single external power adapter is supplying power to power output 146 of apparatus 140 at a time) and prevent device 150 from rebooting or otherwise malfunctioning (which may occur, e.g., due to power fluctuations that occur when transitioning from a plurality of simultaneously applied power sources to a single power source).

Figure 3:
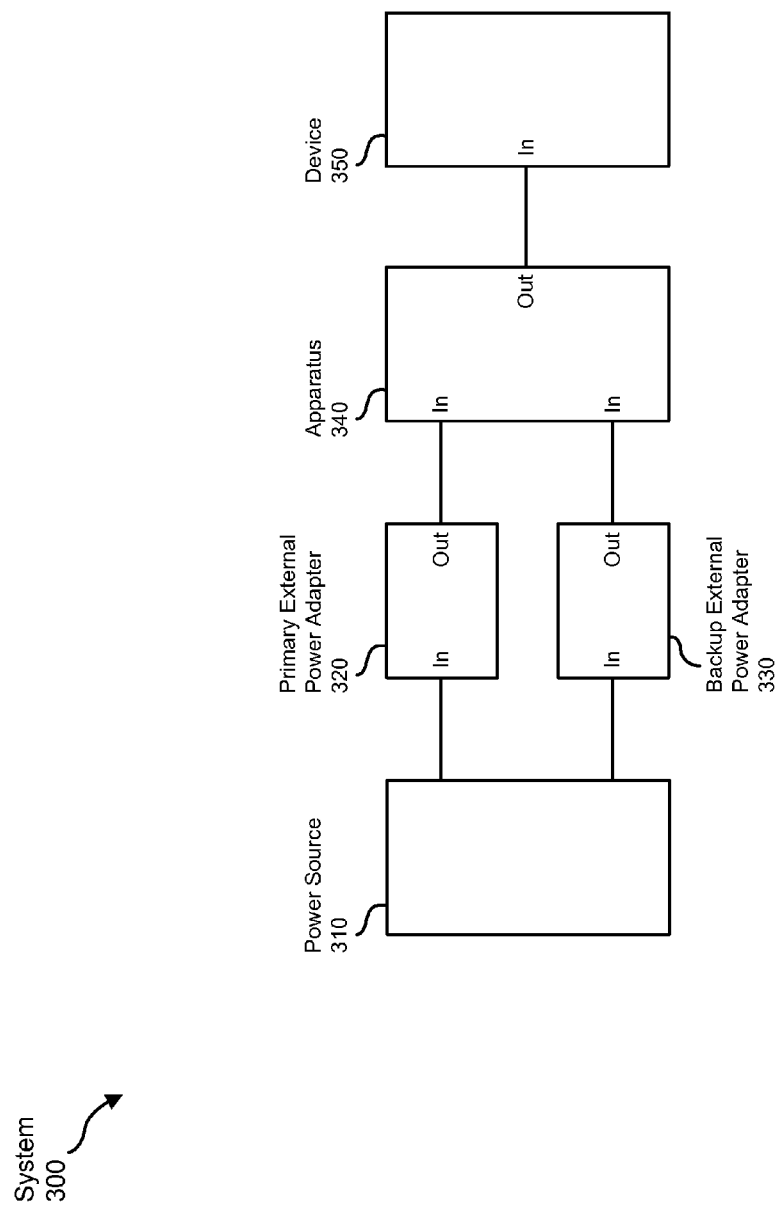
FIG. 3 is a block diagram of an additional exemplary system for providing power redundancy to a device designed to draw power from a single external power adapter.

As detailed above, the external power adapters described herein may be configured to draw alternating current from independent power sources. In other examples, however, these external power adapters may draw alternating current from a single (i.e., the same) power source. For example, and as illustrated in FIG. 3, primary external power adapter 320 and backup external power adapter 330 within system 300 may draw power from a single power source 310. In this example, while the failure of power source 310 would potentially impact the operation of device 350, the malfunction of one of the external power adapters would not. For example, if primary external power adapter 320 fails, a switching mechanism within apparatus 340 may supply direct current from backup external power adapter 330 to the power output of apparatus 340 (and thus device 350), such that the failure of external power adapter 320 would not impact operation of device 350.

Figure 4:
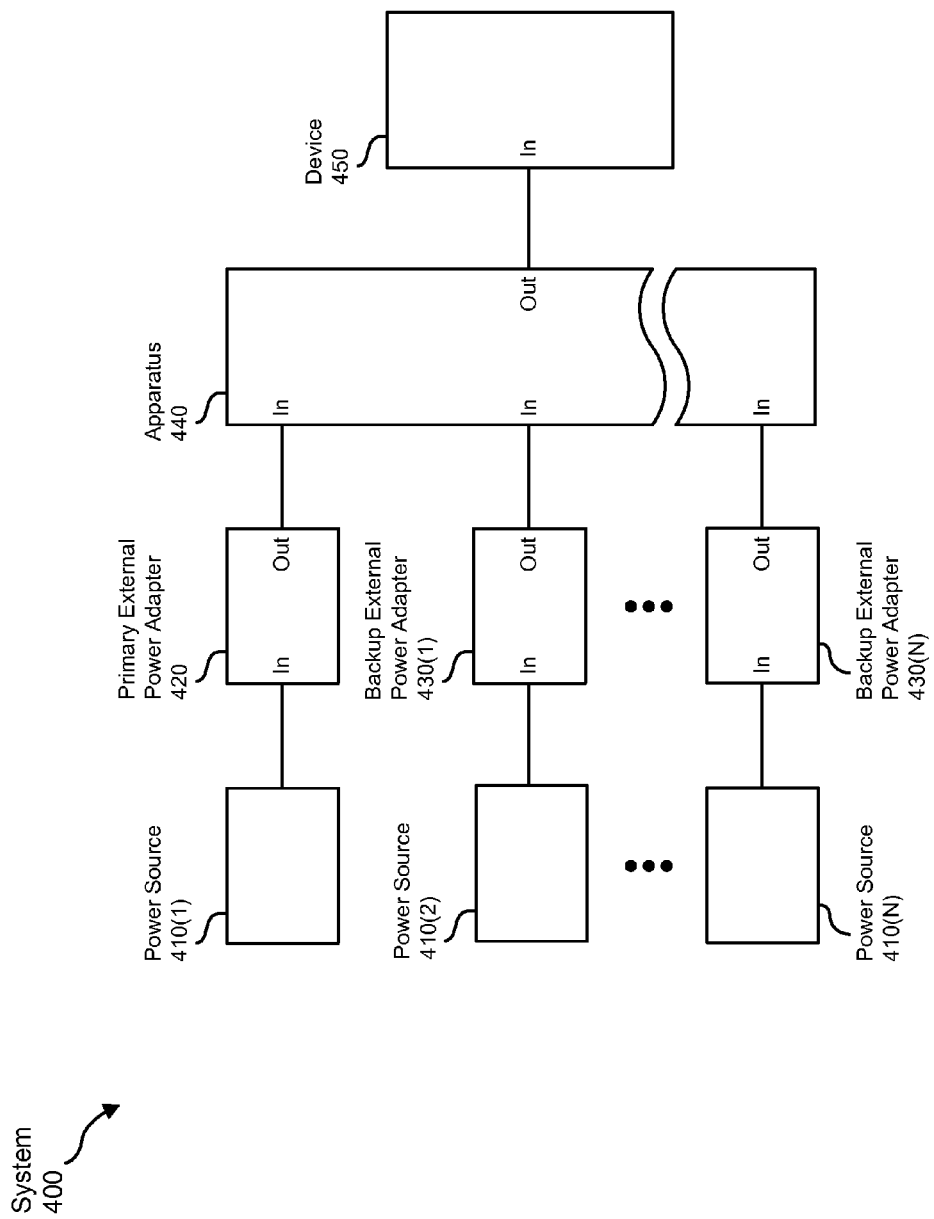
FIG. 4 is a block diagram of an additional exemplary system for providing power redundancy to a device designed to draw power from a single external power adapter.

As detailed above, in some examples apparatus 140 in FIG. 1 may intelligently provide power from two external power adapters (i.e., primary external power adapter 120 and backup external power adapter 130) to device 150. In other examples, however, the apparatuses described herein may intelligently provide power from three or more external power adapters to a device. For example, and as illustrated in FIG. 4, apparatus 440 within system 400 may include a plurality of power inputs configured to receive direct current from a primary external power adapter 420 and a plurality of backup external power adapters 430(1)-(N). In this example, when primary external power adapter 420 and/or power source 410(1) fails, a switching mechanism within apparatus 440 may supply direct current from one of the plurality of backup external power adapters 430(1)-(N) (which may, as detailed above, draw alternating current from power sources 410(2)-(N)) to the power output of apparatus 440 (and thus device 450).

Figure 5:
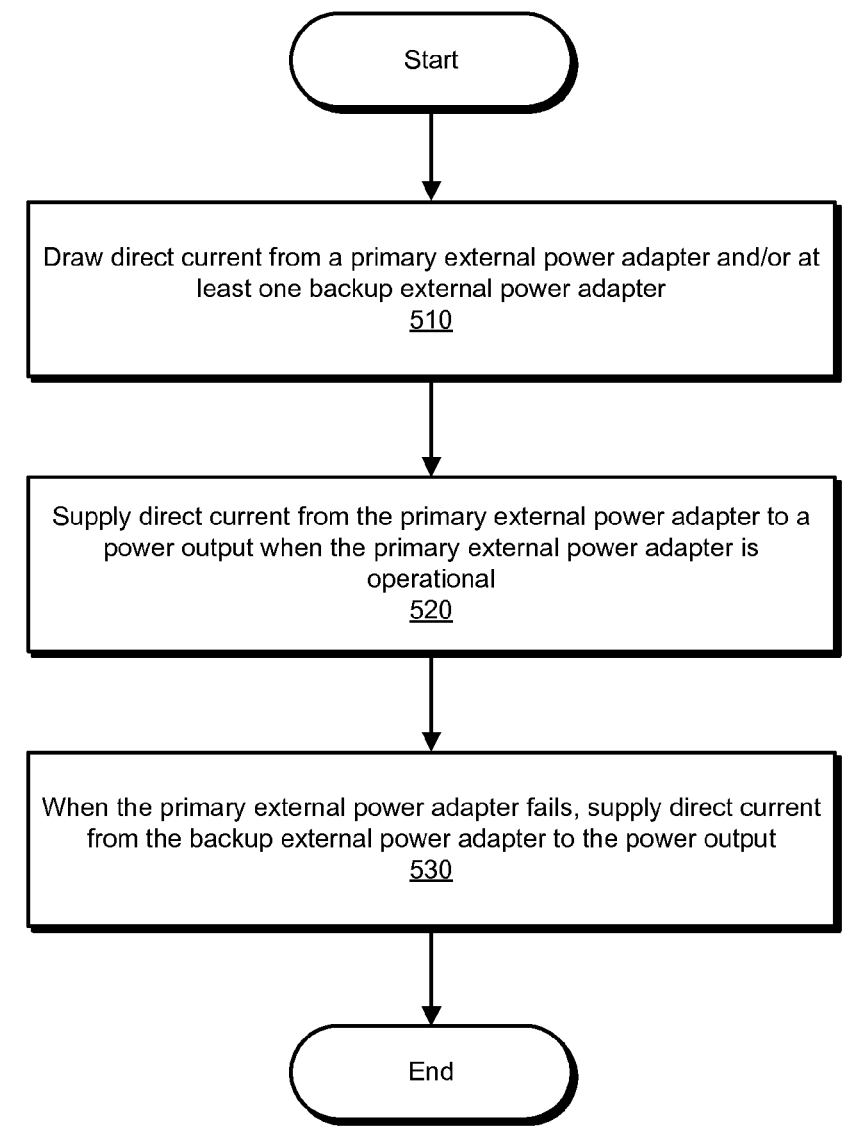
FIG. 5 is a flow diagram of an exemplary method for providing power redundancy to a device designed to draw power from a single external power adapter.

FIG. 5 is a flow diagram of an exemplary method 500 for providing power redundancy to a device designed to draw power from a single external power adapter using the various apparatuses and/or systems described and/or illustrated herein. As illustrated in this figure, at step 510 an apparatus may draw direct current from a primary external power adapter and/or at least one backup external power adapter. For example, and as detailed above, apparatus 140 in FIG. 2 may draw direct current from primary external power adapter 120 and/or backup external power adapter 130.

At step 520, the apparatus may supply direct current from the primary external power adapter to a power output when the primary external power adapter is operational. For example, when primary external power adapter 120 is operational, switching mechanism 145 within apparatus 140 in FIG. 2 may supply direct current from primary external power adapter 120 to power output 146 of apparatus 140 (and thus device 150).

At step 530, the apparatus may supply direct current from the backup external power adapter to the power output when the primary external power adapter fails. For example, when primary external power adapter 120 in FIG. 2 fails, switching mechanism 145 within apparatus 140 may supply direct current from backup external power adapter 130 to power output 146 of apparatus 140 (and thus device 150).

As detailed above, the apparatuses described herein may enable devices that were originally designed and manufactured to draw direct current from a single external power adapter to experience the benefits of power redundancy. For example, by intelligently providing direct current from a plurality of external power adapters to a device that only has a single power input, the apparatuses described herein may allow such a device to remain operational even if one or more of the external power adapters (and/or one or more of the power sources that the external power adapters draw alternating current from) fails. In addition, by only allowing the device to draw direct current from a single external power adapter at a time, these apparatuses may both conserve power and prevent the device from rebooting or otherwise malfunctioning (which may occur, e.g., due to power fluctuations that occur when transitioning from a plurality of simultaneously applied power sources to a single power source). Moreover, since the apparatuses described herein may (either alone or via an adapter) be used in connection with existing devices, these apparatuses may avoid the need to purchase redundant devices and/or external power adapters as backups and/or replace these devices with significantly more expensive systems that include internal redundant power supplies.

Figure 6:
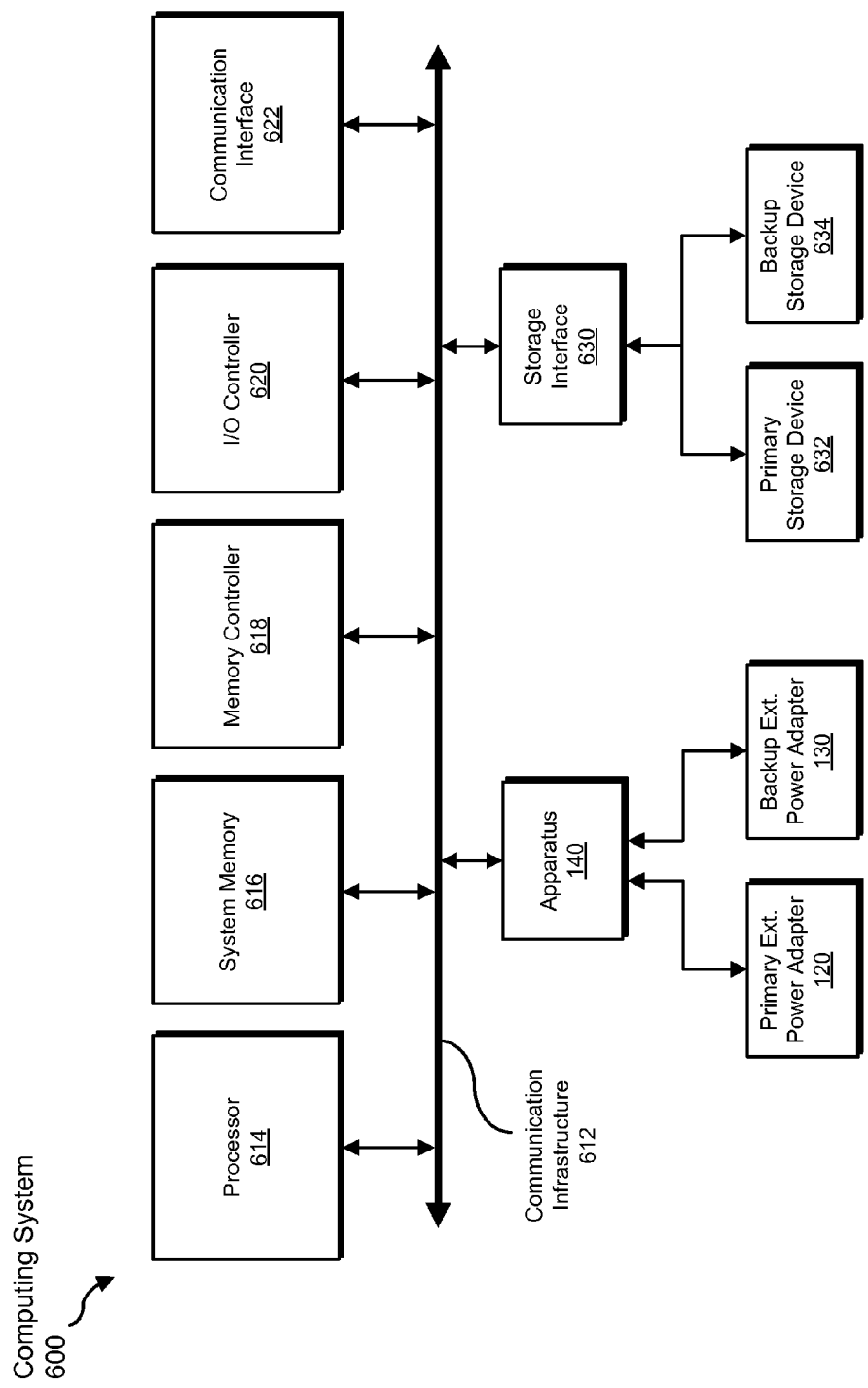
FIG. 6 is a block diagram of an exemplary computing system capable of benefiting from and/or including the embodiments described and/or illustrated herein.

FIG. 6 is a block diagram of an exemplary computing system 600 capable of benefiting from and/or incorporating one or more of the embodiments described and/or illustrated herein. In one example, computing system 600 may include apparatus 140 from FIG. 1. As detailed above, apparatus 140 may provide power redundancy to devices (such as computing system 600) that were originally designed and manufactured to draw direct current from a single external power adapter.

Computing system 600 broadly represents any type or form of electrical load, including a single or multi-processor computing device or system capable of executing computer-readable instructions. In one example, computing system 600 may only include a single power input, thus necessitating apparatus 140 to achieve power redundancy. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, Secure Sockets Layer Virtual Private Network (SSL VPN) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. Processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

In addition, in some examples all or a portion of computing 600 in FIG. 6 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a single physical enclosure that houses:
      a plurality of power inputs configured to receive direct current from a plurality of external power adapters, which are external to the single physical enclosure, that convert alternating current to direct current, the plurality of external power adapters comprising a primary external power adapter and at least one backup external power adapter;
      a single power output configured to provide direct current to a device that is external to the single physical enclosure and configured to draw direct current from a single external power adapter;
      a switching mechanism comprising a portion of memory and a communication infrastructure that both monitor power provided via the plurality of external power adapters and continuously supply power to the device by:
         detecting when the primary external power adapter is operational by detecting when direct current is received at a power input connected to the primary external power adapter;
         detecting when the primary external power adapter fails by detecting when no direct current is received at the power input connected to the primary external power adapter;
         supplying direct current from the primary external power adapter to the power output when the primary external power adapter is operational and supplying direct current from the backup external power adapter to the power output when the primary external power adapter fails.

2. The apparatus of claim 1, wherein detecting when the primary external power adapter fails further comprises detecting at least one of:
   a malfunction of the primary external power adapter;
   a malfunction of a power source from which the primary external power adapter draws alternating current.

3. The apparatus of claim 1, wherein the primary external power adapter is housed in a physical enclosure that is external to, and separate from, a physical enclosure that houses the backup external power adapter.

4. The apparatus of claim 1, wherein the primary external power adapter and the backup external power adapter draw alternating current from independent power sources.

5. The apparatus of claim 1, wherein both the primary external power adapter and the backup external power adapter draw alternating current from a single power source.

6. The apparatus of claim 1, wherein the switching mechanism uses a feedback loop to monitor the power provided via the plurality of external power adapters.

7. The apparatus of claim 1, wherein the switching mechanism prevents the backup external power adapter from supplying direct current to the power output when the primary external power adapter is operational.

8. The apparatus of claim 1, wherein:
   the backup external power adapter comprises a plurality of backup external power adapters;
   when the primary external power adapter fails, the switching mechanism supplies direct current from at least one of the plurality of backup external power adapters to the power output.

9. The apparatus of claim 8, wherein, when the primary external power adapter fails, the switching mechanism supplies direct current from a single backup external power adapter within the plurality of backup external power adapters to the power output.

10. A system comprising:
    a plurality of external power adapters that convert alternating current to direct current, the plurality of external power adapters comprising a primary external power adapter and at least one backup external power adapter;
    an apparatus comprising:
       a single physical enclosure, which is external to the plurality of external power adapters, that houses:
          a plurality of power inputs that are electrically coupled to, and draw direct current from, the plurality of external power adapters;
          a single power output electrically coupled to a device that is external to the single physical enclosure and configured to draw direct current from a single external power adapter;
          a switching mechanism comprising a portion of memory and a communication infrastructure that both monitor power provided via the plurality of external power adapters and continuously supply power to the device by:
             detecting when the primary external power adapter is operational by detecting when direct current is received at a power input electrically coupled to the primary external power adapter;
             detecting when the primary external power adapter fails by detecting when no direct current is received at the power input electrically coupled to the primary external power adapter;
             supplying direct current from the primary external power adapter to the power output when the primary external power adapter is operational and supplying direct current from the backup external power adapter to the power output when the primary external power adapter fails.

11. The system of claim 10, wherein detecting when the primary external power adapter fails further comprises detecting at least one of:
    a malfunction of the primary external power adapter;
    a malfunction of a power source from which the primary external power adapter draws alternating current.

12. The system of claim 10, wherein the primary external power adapter is housed in a physical enclosure that is external to, and separate from, a physical enclosure that houses the backup external power adapter.

13. The system of claim 10, wherein the primary external power adapter and the backup external power adapter draw alternating current from independent power sources.

14. The system of claim 10, wherein both the primary external power adapter and the backup external power adapter draw alternating current from a single power source.

15. The system of claim 10, wherein the switching mechanism uses a feedback loop to monitor the power provided via the plurality of external power adapters.

16. The system of claim 10, wherein the switching mechanism prevents the backup external power adapter from supplying direct current to the power output when the primary external power adapter is operational.

17. The system of claim 10, wherein:
the backup external power adapter comprises a plurality of backup external power adapters;
when the primary external power adapter fails, the switching mechanism supplies direct current from at least one of the plurality of backup external power adapters to the power output.

18. The system of claim 17, wherein, when the primary external power adapter fails, the switching mechanism supplies direct current from a single backup external power adapter within the plurality of backup external power adapters to the power output.

19. A method comprising:
monitoring, at a plurality of power inputs housed within a single physical enclosure, direct current provided to the plurality of inputs via a plurality of power adapters that are external to the single physical enclosure and that convert alternating current to direct current, the plurality of external power adapters comprising a primary external power adapter and at least one backup external power adapter;
continuously providing power to a device that is external to the single physical enclosure and that draws direct current from a single external power adapter by:
detecting when the primary external power adapter is operational by detecting when direct current is provided by the primary external power adapter;
detecting when the primary external power adapter fails by detecting when no direct current is provided by the primary external power adapter;
supplying direct current from the primary external power adapter to a power output that is housed within the single physical enclosure and that is electrically coupled to the external device when the primary external power adapter is operational and supplying direct current from the backup external power adapter to the power output when the primary external power adapter fails.

20. The method of claim 19, further comprising preventing the backup external power adapter from supplying direct current to the power output when the primary external power adapter is operational.

\* \* \* \* \*